J. B. NEWMAN.

CHECK AND SHADE HOLDER.

No. 11,535. Reissued Apr. 28, 1896.

Witnesses.

C. B. Lundy

E. Bradford

Inventor.

John Byrow Newman by his attorney

E. W. Bradford

ANDREW B. GRAHAM, PHOTO-LITHO. WASHINGTON, D.C.

UNITED STATES PATENT OFFICE.

JOHN BYRON NEWMAN, OF DETROIT, MICHIGAN.

CHECK AND SHADE HOLDER.

SPECIFICATION forming part of Reissued Letters Patent No. 11,535, dated April 28, 1896.

Original No. 552,071, dated December 24, 1895. Application for reissue filed March 28, 1896. Serial No. 585,308.

*To all whom it may concern:*

Be it known that I, JOHN BYRON NEWMAN, a subject of the Queen of England, residing at Detroit, in the county of Wayne, State of Michigan, have invented a certain new and useful Improvement in Check and Shade Holders; and I declare the following to be a full, clear, and exact description of the invention, such as will enable others skilled in the art to which it pertains to make and use the same, reference being had to the accompanying drawings, which form a part of this specification.

My invention relates to that class of harness attachments which are secured to the back-band and which serve to removably hold the rear end of the checkrein and also furnish means for carrying other articles of utility or ornament, such as bells, &c. Its object is to provide a device that will prevent the accidental unfastening of the checkrein by the animal and at the same time permit it to be readily connected to or detached therefrom.

A further object is to provide convenient means for carrying ornaments of various classes commonly used about horses and also to serve as a fastening means for fly-nets or articles of like character.

It consists in certain peculiar and novel features of construction and arrangement, as hereinafter described, and pointed out in the appended claims.

My invention is clearly illustrated in the accompanying drawings, which, with the letters of reference marked thereon, form a part of this specification, and in which—

Figure 1:
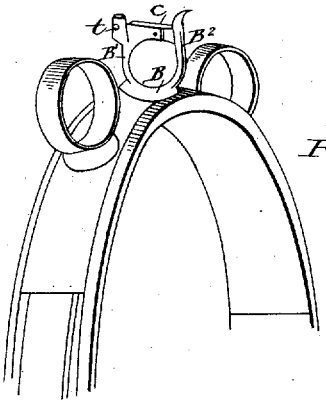
Figure 2:
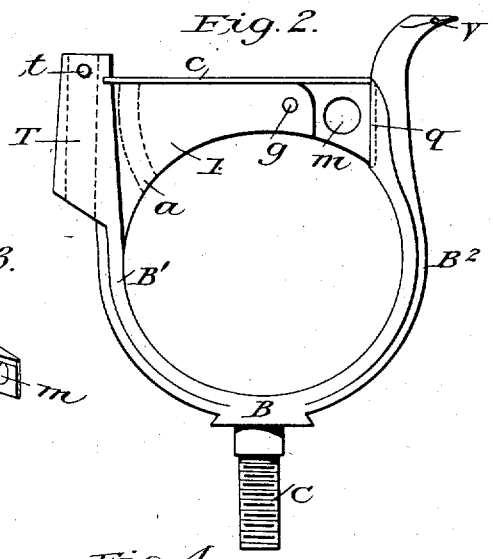
Figure 3:
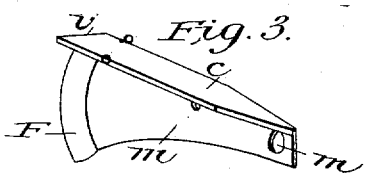
Figure 4:
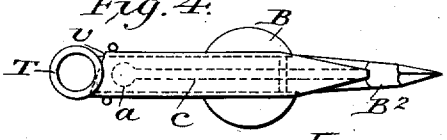

Figure 1 is a perspective view of my device, showing it in position upon the back-band of the harness. Fig. 2 is a side elevation of the same. Fig. 3 shows the lever in perspective. Fig. 4 is a plan view of the device.

Referring to the drawings, B indicates the base portion of the device, which is provided with the depending screw C, serving to secure the device to the back-band of the harness.

$B'$ $B^2$ are upwardly-extending branches of a U-shaped body, one of which, $B'$, terminates at its upper end with and unites in forming the tubular holder T. The other, $B^2$, forms the check proper and terminates with any suitable ornament, preferably in the form of a gooseneck, as shown. Formed integral with the inner side and near the upper end of the tubular holder T is a split supporting-arm *l*. This arm extends laterally in the direction of the opposite branch $B^2$, spanning about two-thirds of the distance between the two branches.

Pivoted at *g* and supported between the two parts of the split arm above referred to is a gravity-lever *m*. (Seen best in Fig. 3.) Its lower edge is curved to correspond to the curvature of the lower inner edge of the supporting-arm and its upper edge is straight and provided with a protecting-plate *c*, for a purpose hereinafter pointed out. This plate may be formed integral with the lever or made separate and secured by any suitable means.

Upon the inner side of the gooseneck there is provided a shallow groove or way *q*, directly in the path of the forward end of the lever *m*, which is constructed to engage therein when the lever is in its closed position, as shown in Figs. 2 and 4. At the same time the rear end of the protection-plate is arranged to project slightly beyond the lever and to engage within the notch *a*, formed upon the inner side of the holder T. This engagement may be made by giving the lever sufficient lateral motion in its support to allow the beveled end *v* of the plate *c* to be freed from the notch and to be forced in and out; or, as I have shown, it may be made by aiding the lateral movement in providing for a slight bending motion in the engaging end of the plate. This is accomplished by allowing the end *v*, as above stated, to extend beyond the rear end of the lever.

In order to utilize gravity to assist in operating and preventing the accidental disengagement of the checkrein, I load the rear end of the lever, as shown at F, by means of the enlarged edge or bead, which is curved around the pivot-center of the lever. This construction provides the necessary weight to that end and is so arranged between the two parts of the split supporting-arm as to produce the desired result without giving to the device an awkward and clumsy appearance.

In check-hooks of this character wherever a lever or movable part of any kind has been employed it has invariably proved a failure owing to the action of rain or moisture when allowed to get into the working joints of the parts. Interferences of this kind I avoid by the use of the protection-plate above described, for, as will be noticed upon referring to Fig. 4, the plate covers the entire joint and extends over the outer edges of the supporting-arm, thus acting as a roof over the moving parts to protect them from the elements. At the same time the overlapping edges serve as means by which the lever may be readily lifted out of engagement with the holding-notch to engage or disengage the checkrein.

The general construction of my invention is such that it is not only valuable as a check-rein-holder, but as a convenient means for carrying ornaments of any description, such as bells, as I have mentioned. For this purpose I provide the tubular holder T, which I find to be of great convenience and utility. At the same time my device offers numerous convenient points to which a fly-net or articles of like character may be secured. As, for example, I have provided an eye at V in the upper end of the gooseneck, also a lug *t* on the side and at the upper end of the holder, both of which are adapted to be employed for this purpose.

It is obvious that this device may be altered in its construction and arrangement without materially departing from the spirit of my invention, and I would have it understood that while I prefer the particular form shown and described I do not desire to limit myself thereto.

Having thus described my invention, what I desire to claim is—

1. In a check and shade holder, the combination of a base portion provided with a holding-screw and an upwardly-extending U-shaped body, a tubular holder provided with a laterally-extending supporting-arm and forming the terminal of one of the branches of said U-shaped body, a gravity-lever pivotally supported upon said laterally-extending arm and means whereby said lever is prevented from accidental displacement, substantially as described.

2. In a check and shade holder, the combination of the base portion B, provided with a holding-screw C, and upward-extending branches $B'$ $B^2$, the tubular holder T, formed integral with the upper end of said terminal $B'$, and provided with the inward-extending supporting-arm *l*, and notch *a*, a lever *m*, pivotally supported on said inward-extending arm having its rear end provided with the weight F, and its forward end adapted to engage in the groove *q*, upon the inside of the upward-extending branch $B^2$, and the protection-plate *c*, secured to the upper edge of said lever and having its rear end arranged to engage within the notch *a*, when said lever is in its closed position, substantially as described.

JOHN BYRON NEWMAN.

Witnesses:
C. B. LUNDY,
D. W. BRADFORD.